United States Patent
Tahira et al.

(10) Patent No.: US 7,471,722 B2
(45) Date of Patent: Dec. 30, 2008

(54) VIDEO ENCODING DEVICE AND METHOD

(75) Inventors: Takahiko Tahira, Kawasaki (JP); Tatsushi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 912 days.

(21) Appl. No.: 11/023,344

(22) Filed: Dec. 29, 2004

(65) Prior Publication Data

US 2006/0029128 A1 Feb. 9, 2006

(30) Foreign Application Priority Data

Aug. 3, 2004 (JP) ............................. 2004-226570

(51) Int. Cl. *H04N 7/12* (2006.01)
(52) U.S. Cl. .............. 375/240.01; 375/240; 375/240.12
(58) Field of Classification Search .................. 375/240, 375/240.01, 240.03, 240.12
See application file for complete search history.

(56) References Cited

U.S. PATENT DOCUMENTS 6,956,899 B2 * 10/2005 Hall et al. .............. 375/240.03

FOREIGN PATENT DOCUMENTS

| JP | 11-075197 | 3/1999 |
|---|---|---|
| JP | 11-098502 A | 4/1999 |
| JP | 2001-045436 | 2/2001 |
| JP | 2001-086512 A | 3/2001 |
| JP | 2001-136530 | 5/2001 |
| JP | 2004-056677 A | 2/2004 |

* cited by examiner

*Primary Examiner*—Allen Wong
(74) *Attorney, Agent, or Firm*—Arent Fox LLP (57) ABSTRACT

A video encoding device capable of performing a near-real-time encoding process while restraining deterioration in image quality. A first encoding section encodes a video signal to generate a first stream and extracts stream information including space- and time- related information of the video signal. A stream buffer stores video scenes of the first stream which correspond to a partial time of the video signal. An encoding control section analyzes a code generation rate and motion information from the stream information to generate encoding control information. A second encoding section encodes the first stream read from the stream buffer, in accordance with the encoding control information, to generate a second stream. The stream buffer stores multiples video scenes of the first stream by means of which a scene change can be detected as an information rate change.

7 Claims, 7 Drawing Sheets

| STREAM INFORMATION | | ENCODING CONTROL INFORMATION |
|---|---|---|
| NAME OF PARAMETER | MAIN PURPOSE OF ANALYSIS | |
| ENCODING PICTURE TYPE | ALLOTMENT OF CODE GENERATION RATE (TIME DOMAIN) | TARGET CODE GENERATION RATE |
| ENCODING INFORMATION GENERATION RATE | ALLOTMENT OF CODE GENERATION RATE (TIME DOMAIN) | |
| SCENE CHANGE INFORMATION | ALLOTMENT OF CODE GENERATION RATE (TIME DOMAIN) | |
| VIDEO ACTIVITY VALUE (COMPLEXITY INDEX) | ALLOTMENT OF CODE GENERATION RATE (SPACE DOMAIN) | SPATIAL FILTER FACTOR (FILTER INTENSITY) |
| QUANTIZATION SCALE VALUE | ALLOTMENT OF CODE GENERATION RATE (SPACE DOMAIN) | |
| MOTION VECTOR VALUE | DETECTION OF MOTION INFORMATION (SPACE DOMAIN) | |
| PREDICTION TYPE | DETECTION OF MOTION INFORMATION (SPACE DOMAIN) | |
| DCT TYPE | DETECTION OF MOTION INFORMATION (SPACE DOMAIN) | |

VIDEO ENCODING DEVICE AND METHOD

CROSS-REFERENCE TO RELATED APPLICATIONS

This application is based upon and claims priority of Japanese Patent Application No. 2004-226570, filed on Aug. 3, 2004, the contents being incorporated herein by reference.

BACKGROUND OF THE INVENTION (1) Field of the Invention

The present invention relates to video encoding device and method, and more particularly, to video encoding device and method for encoding a video signal in conformity with MPEG (Moving Picture Experts Group).

(2) Description of the Related Art

In recent years, encoding/compression techniques conformable to MPEG are widely used in DVDs (Digital Versatile Discs) and in the field of digital TV broadcasting, in order to record and transmit a vast amount of video data with high quality.

Also, digital video recorders, which are adapted to encode/compress an input video signal according to MPEG and then store the compressed bit stream on a DVD or HDD (Hard Disk Drive), and like devices have become popular on the market.

Encoding devices conformable to MPEG adopt one of two encoding schemes, namely, real-time encoding and 2-pass encoding. In real-time encoding, the set bit rate for encoding is nearly fixed, irrespective of video scene, so that the compressed bit stream may fit in the data size of given media.

On the other hand, 2-pass encoding is a variable-bit-rate encoding scheme wherein all video scenes are once encoded to obtain a history of detailed information during the encoding of the whole video material and then the information rate control for the second-pass encoding is scheduled in accordance with the historical information.

Figure 6:
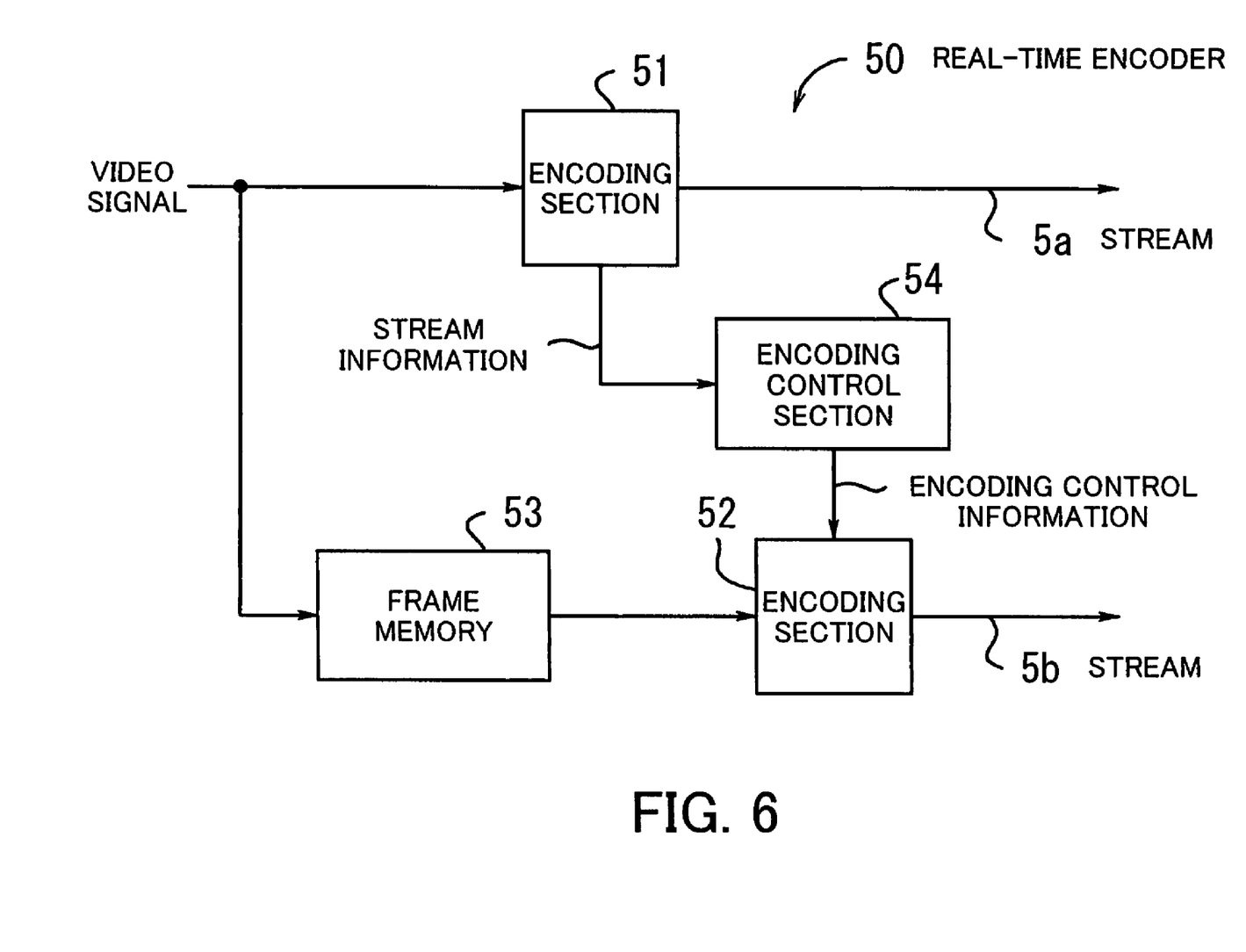
FIG. 6 is a diagram showing the configuration of a real-time encoder.

FIG. 6 shows the configuration of a real-time encoder. The real-time encoder 50 comprises encoding sections 51 and 52, a frame memory 53, and an encoding control section 54.

The encoding section 51 encodes a video signal (including audio) to generate a stream (encoded data) 5a, which is then output. Also, the encoding section 51 sends information, such as motion vectors obtained during the encoding, to the encoding control section 54 as stream information.

The frame memory 53 temporarily stores the input video signal and outputs the signal with a certain delay. The encoding control section 54 generates encoding control information from the received stream information, and sends the generated information to the encoding section 52. In accordance with the encoding control information, the encoding section 52 encodes the video signal output from the frame memory 53 and outputs a stream 5b obtained as a result.

Thus, the encoding section 51 first coarsely encodes the video signal to output the stream 5a at a relatively high bit rate (e.g., 15 Mbps). Then, using the information needed for the encoding, the encoding section 52 finely encodes the video signal to output the stream 5b at a lower bit rate (e.g., 5 Mbps) than the stream 5a. The stream 5a is sent, for example, to a recording medium such as an HDD, while the stream 5b is delivered through the Internet.

Figure 7:
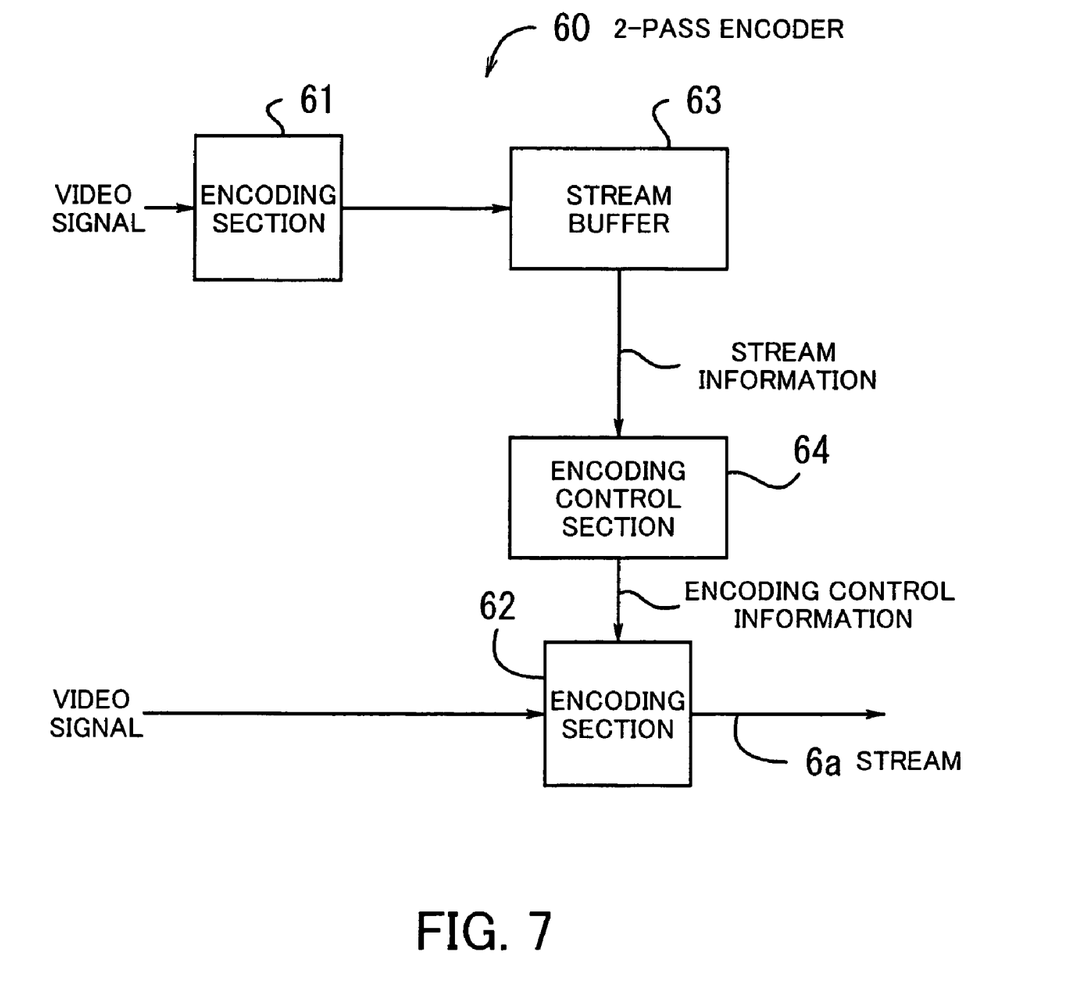
FIG. 7 is a diagram showing the configuration of a 2-pass encoder.

FIG. 7 shows the configuration of a 2-pass encoder. The 2-pass encoder 60 comprises encoding sections 61 and 62, a stream buffer (HDD etc.) 63, and an encoding control section 64. The term "pass" denotes the number of times one video material is encoded to be output as a stream.

The encoding section 61 is input with a whole sequence of video signal from beginning to end and encodes the video signal. The encoded stream is temporarily stored in the stream buffer 63. The encoding control section 64 analyzes features of the video signal, based on detailed information (motion vector information etc.) on the stream stored in the stream buffer 63, and generates encoding control information such as information rate control schedule.

The encoding section 62 is input with the same video signal as that encoded by the encoding section 61 after a lapse of a certain period of time (e.g., after a lapse of two hours if the video signal constitutes video content of two hours long). Then, in accordance with the encoding control information previously generated, the encoding section 62 performs second-pass encoding and outputs a stream 6a. This process permits encoding with much less deterioration in the image quality.

As techniques applicable to conventional encoding devices, there has been proposed a technique of encoding digital video data such that the video data is converted into a resolution, bit rate, etc. suited to the connected device (e.g., Unexamined Japanese Patent Publication No. 2001-045436 (paragraph no. [0018], FIG. 1)).

The real-time encoder 50 of FIG. 6 is required to broadcast a stream live to viewers, as explained above in the "Description of the Related Art" section, and because of the nature of live broadcasting, immediate processing must be given priority when encoding the stream for live delivery.

In the real-time encoder 50, however, since only a short time corresponding to the delay time of the frame memory 53 (e.g., a delay time corresponding to about one frame) can be allotted for the encoding control information to be notified from the encoding control section 54, it is not possible to obtain time-related information such as scene changes.

Thus, the video signal is encoded at a nearly constant bit rate, irrespective of video scene, and in cases where the input video scene switches to one having a complex picture pattern, for example, the scene fails to be encoded at a sufficient coding rate, giving rise to a problem that deterioration in the image quality, such as block noise, becomes conspicuous.

In the 2-pass encoder 60 of FIG. 7, on the other hand, the encoding control information is generated after the whole video is encoded by the first-pass encoding, thereby permitting the features of the video to be detected in advance. Accordingly, at the time of the second-pass encoding, the encoding control information can be used to allocate a high bit rate to complex video scenes and a low bit rate to plain video scenes, thus enabling encoding with less deterioration in the image quality.

However, the 2-pass encoder 60 requires a significantly long processing time to previously encode the video signal from beginning to end. Because of complete loss of the real-time property or simultaneity, a problem arises in that the 2-pass encoder cannot be used for the delivery of a live broadcast etc.

Thus, the real-time property and the improvement of image quality are in the trade-off relationship, and conventional encoding devices fall under either devices placing importance on the real-time property or devices placing importance on the improvement of image quality.

At present, an encoding device which has the real-time property to a certain degree (near-real-time property), not to the extent of perfect-real-time property, and in which deterioration in the image quality is restrained is not developed yet, and there has been a strong demand for such an encoding device. The aforementioned conventional technique (Unexamined Japanese Patent Publication No. 2001-045436) is directed to improving the image quality in accordance with the connected device and does not take account of the real-time property.

SUMMARY OF THE INVENTION

The present invention provides a video encoding device for encoding a video signal. The video encoding device comprises a first encoding section for encoding a video signal to generate a first stream and extracting stream information including space- and time-related information of the video signal, a stream buffer for storing video scenes of the first stream which correspond to a partial time of the video signal, an encoding control section for detecting a change of information rate from the stream information and analyzing a code generation rate and motion information to generate encoding control information within a time during which the first stream can be stored in the stream buffer without exceeding a size thereof, and a second encoding section for encoding the first stream read from the stream buffer, in accordance with the encoding control information, to generate a second stream.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

The present invention was created in view of the above circumstances, and an object thereof is to provide a video encoding device for performing a near-real-time encoding process while restraining deterioration in the image quality.

Another object of the present invention is to provide a video encoding method for performing a near-real-time encoding process while restraining deterioration in the image quality.

Figure 1:
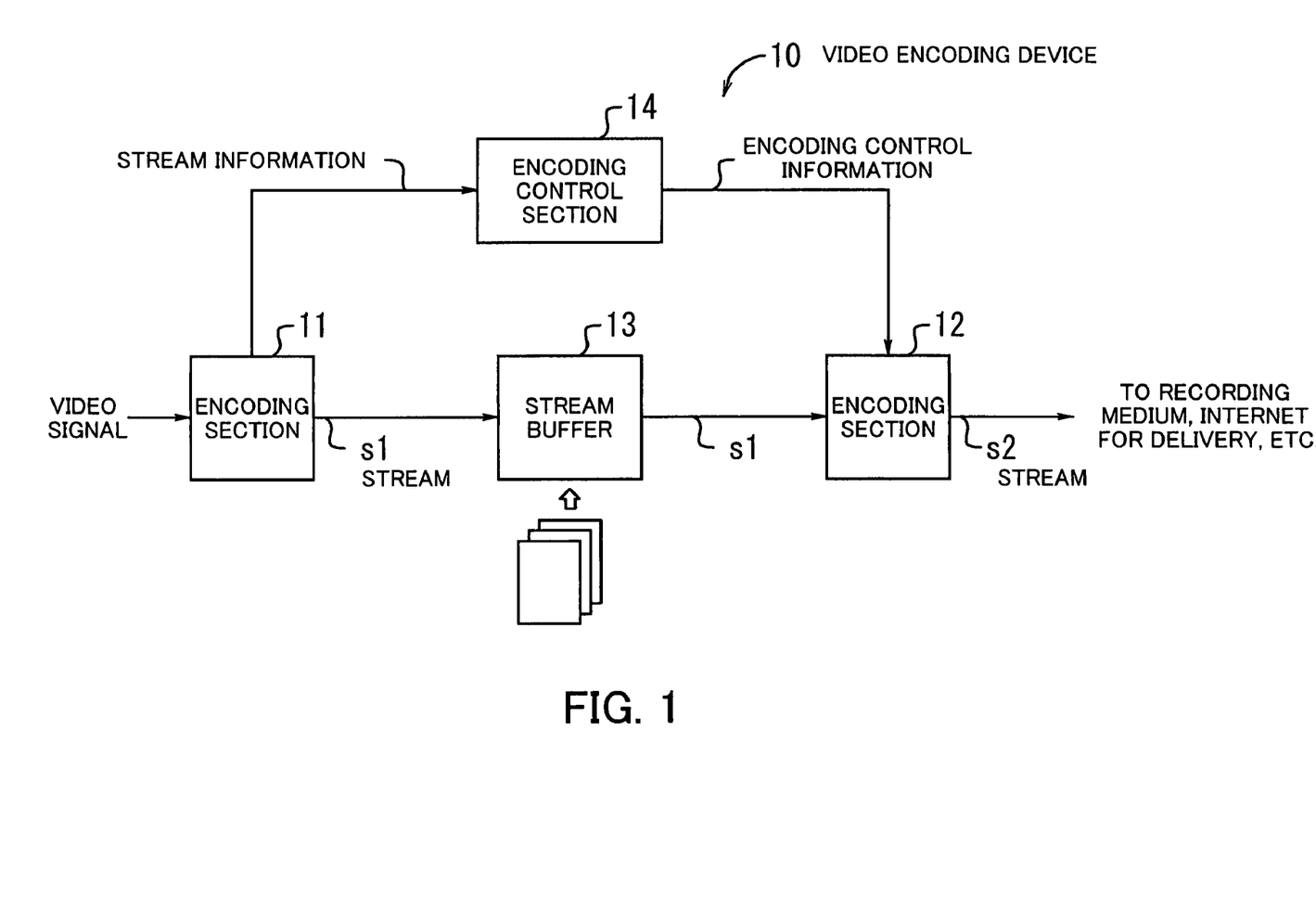
FIG. 1 is a diagram illustrating the principle of a video encoding device.

An embodiment of the present invention will be hereinafter described with reference to the drawings. FIG. 1 illustrates the principle of a video encoding device. The video encoding device 10 comprises a first encoding section (hereinafter "encoding section 11"), a second encoding section (hereinafter "encoding section 12"), a stream buffer 13, and an encoding control section 14.

The encoding section 11 encodes a video signal to generate a first stream (stream s1) and also extracts stream information including space- and time-related information of the video signal.

The stream buffer 13 stores video scenes of the stream s1 which correspond to a partial time of the video signal.

For example, the stream buffer 13 stores multiple video scenes of the stream s1 that span a time necessary for detecting a change of information rate. Specifically, the stream buffer 13 stores multiple video scenes (corresponding to several seconds to several tens of seconds) of the stream s1 that permit a scene change to be detected as an information rate change.

The encoding control section 14 detects an information rate change (scene change) from the stream information and analyzes a code generation rate and motion information to generate encoding control information within a time during which the stream can be stored in the stream buffer 13 without exceeding the size thereof (i.e., within the video scene storage time of several seconds to several tens of seconds).

The encoding section 12 encodes the stream s1 read from the stream buffer 13, in accordance with the encoding control information, to generate a second stream (stream s2). The stream s2 is sent to a recording medium or delivered through the Internet.

The buffer size of the stream buffer 13 will be now explained. The longer the time allotted for the analysis of the stream, the more information can be fed back to the encoding section 12 for the second-pass encoding, improving the image quality. In this case, however, the real-time property is lost and also a large-capacity buffer is required.

Accordingly, the stream buffer 13 used has a buffer size capable of storing several seconds to several tens of seconds of the stream, and the encoding control section 14 analyzes the stream within a time during which the stream can be stored in the stream buffer without exceeding the buffer size.

Ordinary viewers use video recording devices such as DVD recorders or hard disk recorders in order to record TV programs. In such cases, a TV commercial presented in the course of the program causes a sudden scene change.

Screens before and after a scene change entirely differ from each other, and accordingly, if the time of occurrence of the scene change and the information rate change are known beforehand, then it is possible to perform an appropriate encoding process (by increasing or decreasing the bit rate to be allocated). Such a scene change accompanying an information rate change, regardless of whether it takes place due to a TV commercial or in an ordinary program, can be detected if the stream can be temporarily stored for a length of several seconds to several tens of seconds.

In the video encoding device 10, therefore, the stream buffer 13 stores multiple video scenes corresponding to a time necessary for detecting an information rate change (scene change), and the encoding control section 14 analyzes the code generation rate and the motion information from the stream information to generate encoding control information and feeds back the generated information to the second-pass encoding section 12 within the storage time.

With this configuration, the delay time of the stream buffer 13 is several seconds to several tens of seconds, and the stream can be analyzed to generate encoding control information within this time period, making it possible to previously detect video features such as scene changes where the picture pattern greatly changes. In the second-pass encoding, therefore, it is possible to allocate a high bit rate to complex video scenes and a low bit rate to plain video scenes in accordance with the encoding control information. This permits encoding with restrained deterioration in the image quality to be performed while maintaining the real-time property to a certain degree (near-real-time property), though not perfect.

Figure 2:
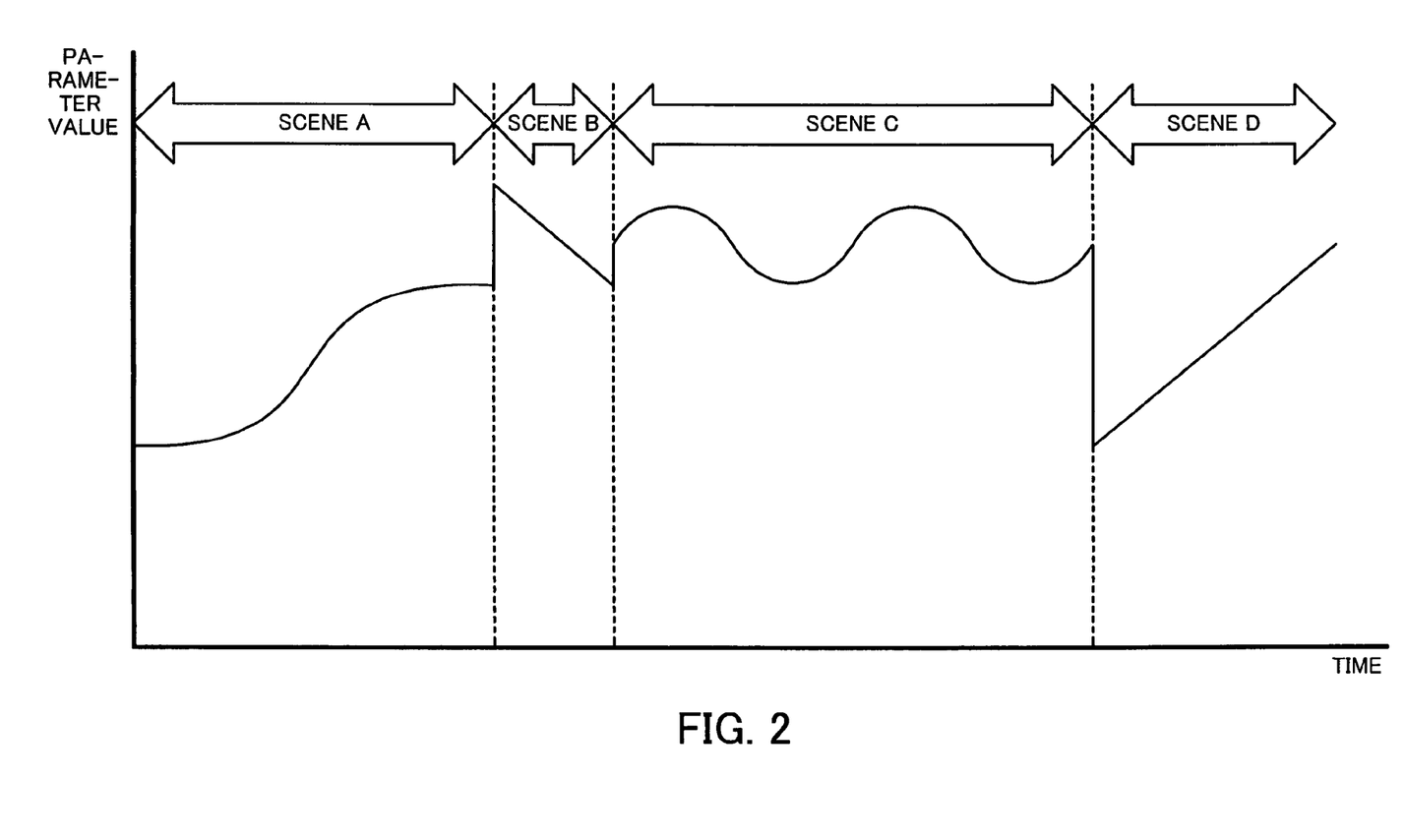
FIG. 2 is a chart showing a parameter variation of video including multiple scenes.

Scene change detection will be now explained. FIG. 2 shows a parameter variation of video including multiple scenes, wherein the vertical axis indicates parameter value and the horizontal axis indicates time. The term "parameter" denotes a value of the stream information (described later with reference to FIG. 5).

Natural video (video not artificially modified) generally includes a plurality of scenes within a time span of several seconds to several tens of seconds. FIG. 2 shows a general example of such video which includes four scenes A to D within a given time span. FIG. 2 shows how the parameter value of certain stream information undergoes a transition at the changeover of scenes.

The parameter value shows a nearly linear transition within one scene of video signal because its correlation with time is very strong within a scene. However, at the moment of changeover from one scene to another, the parameter value shows a nonlinear transition because the adjacent scenes have no correlation at all.

Figure 3:
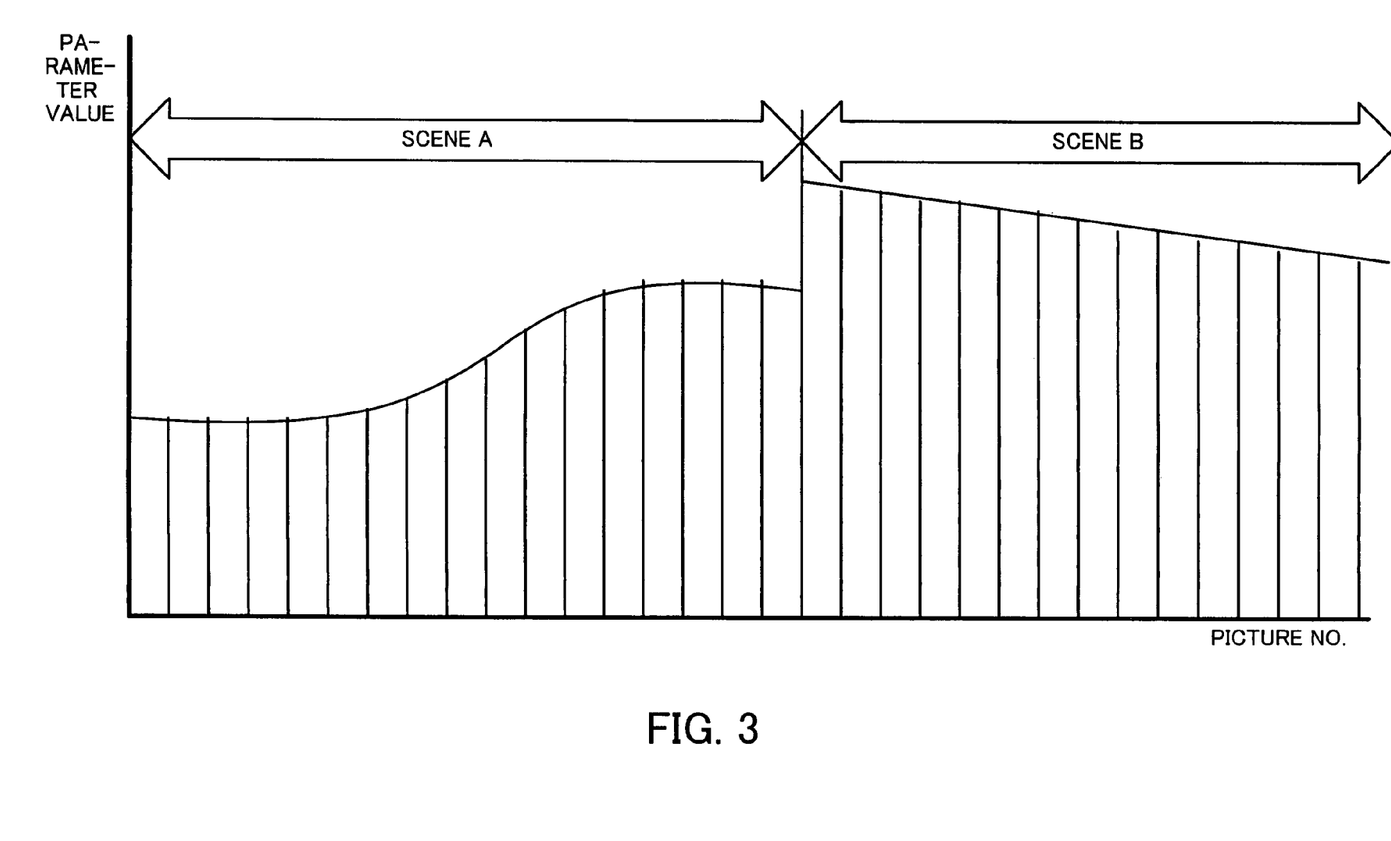
FIG. 3 is a chart also showing the parameter variation of video including multiple scenes.

FIG. 3 shows the same parameter variation of video including multiple scenes but within a time range shorter than that in the graph of FIG. 2, wherein the vertical axis indicates parameter value and the horizontal axis indicates picture number. The parameter value shows a nearly linear transition within each of the scenes A and B, but greatly varies at the boundary between the scenes A and B. By detecting such a variation of the parameter value, it is possible to detect the occurrence of a scene change.

Figure 4:
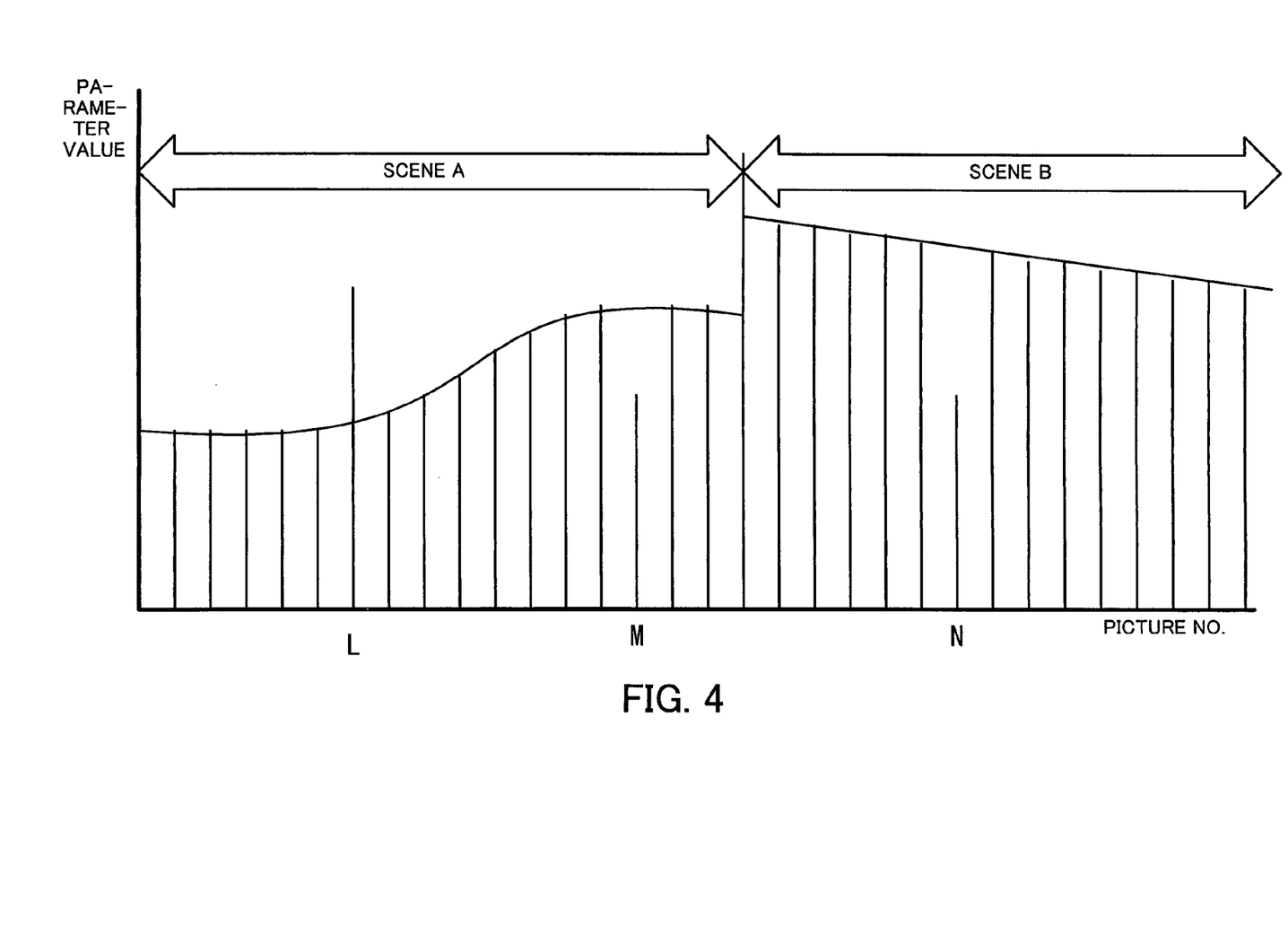
FIG. 4 is a chart illustrating correction for erroneous detection of a parameter value.

FIG. 4 illustrates correction for erroneous detection of the parameter value. In the case where the parameter assumes a value remarkably different from those of preceding and succeeding pictures (in FIG. 4, indicated at L, M and N) within one scene, the encoding control section 14 can estimate that the difference of the parameter value has been caused due to erroneous detection, by analyzing the trend of several pictures preceding and succeeding the picture in question, whereby the encoding control accuracy can be enhanced.

In this manner, high-accuracy scene change detection as well as high-accuracy encoding control can be performed if video scenes spanning several seconds to several tens of seconds can be analyzed. As the encoding scheme of the video encoding device 10, therefore, the stream buffer has only to have a buffer size capable of storing several seconds to several tens of seconds of video, and also since the required buffer size is much smaller than that of the conventional 2-pass encoder, the cost can be reduced.

Figure 5:
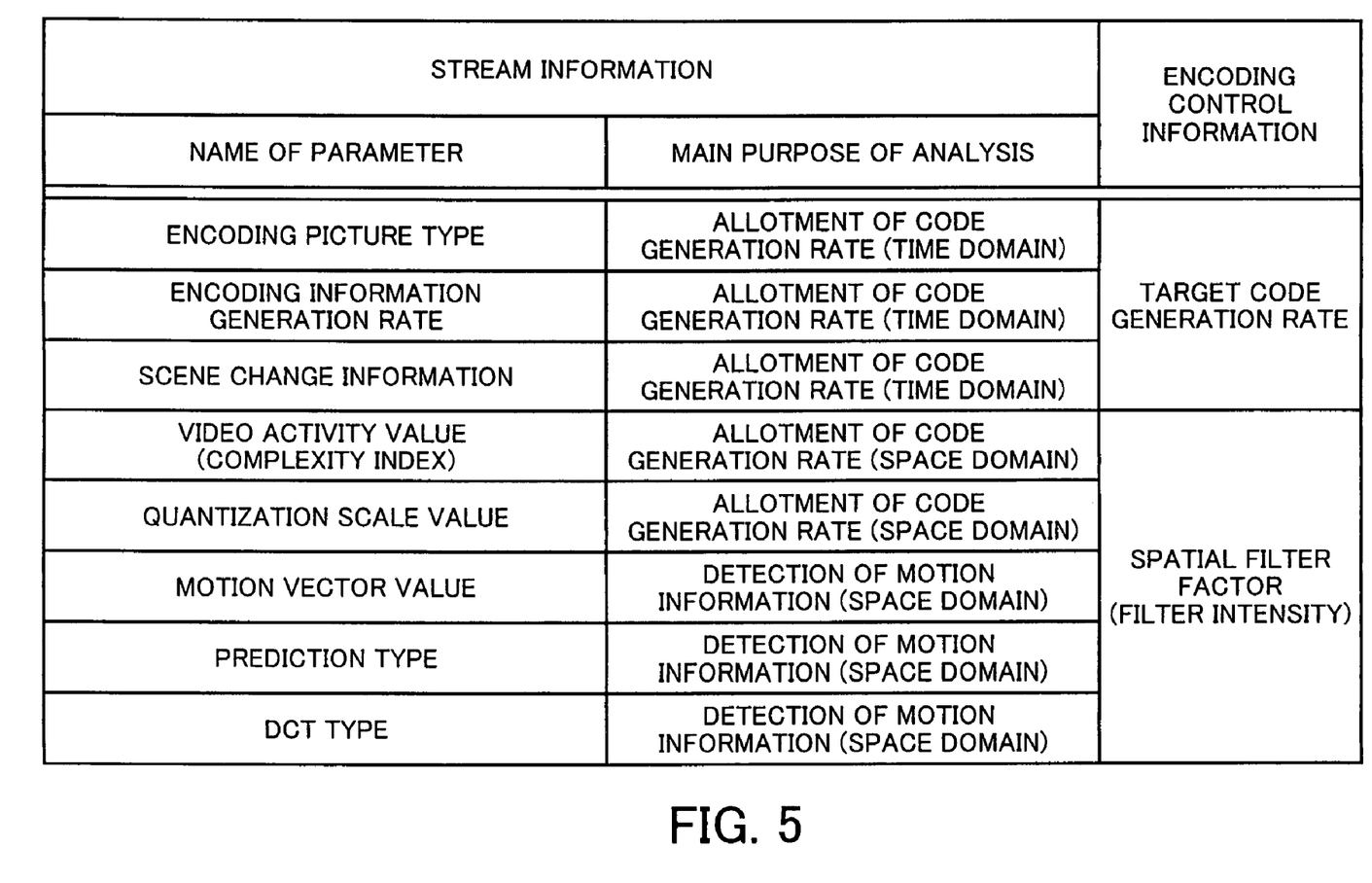
FIG. 5 is a chart showing the correspondence between stream information and encoding control information.

The stream information and the encoding control information will be now explained. FIG. 5 illustrates the correspondence between the stream information and the encoding control information. Specifically, the stream information includes parameters such as encoding picture type, encoding information generation rate, quantization scale value, motion vector value, video activity value, scene change information, prediction type, and DCT type. Also, the encoding control information includes target code generation rate per unit time, spatial filter factor (intensity) of each video scene, etc.

The individual parameters are analyzed mainly for the purpose of deriving code generation rates in the time and space domains and detecting motion information in the space domain. By analyzing the code generation rates in the time domain, it is possible to calculate a target code generation rate for the second-pass encoding of the picture concerned. Also, the degree of bias of the space-related information rate can be derived by analyzing the code generation rates in the space domain and detecting the motion information in the space domain. Thus, by using the analysis results as a criterion of the spatial filter intensity for the second-pass encoding, it is possible to efficiently compress the information.

As described above, the video encoding device and method permit the detailed information obtained during the first-pass encoding to be fed back to the second-pass encoding. It is therefore possible to pre-read the transitional trend of the video picture patterns to be encoded and of the encoding information rate, etc., and since the information rate control for the second-pass encoding can be easily scheduled, the information can be efficiently compressed in space or time. As a consequence, encoding with less deterioration in the image quality can be performed, and since the real-time property is ensured to a certain degree, this encoding scheme can be applied to diverse purposes.

The conventional real-time encoder is incapable of the video analysis using a plurality of preceding and succeeding pictures, explained above with reference to FIG. 4, and thus has a disadvantage that the encoding information feedback accuracy is poor (erroneous detection cannot be detected). By contrast, the video encoding device 10 can analyze video by using a plurality of preceding and succeeding pictures, whereby the accuracy of the encoding control can be enhanced. Also, it is possible to obtain high-accuracy encoding information equivalent to that of the conventional 2-pass encoder, without using a large-capacity stream buffer as used in the conventional 2-pass encoder.

The video encoding device of the present invention encodes a video signal to generate a first stream, extracts stream information including space- and time-related information of the video signal, and stores video scenes corresponding to a partial time of the video signal. Then, the video encoding device detects an information rate change from the stream information, analyzes the code generation rate and the motion information to generate encoding control information, and using the encoding control information, encodes the first stream read from the stream buffer. This makes it possible to perform a near-real-time encoding process while at the same time restraining deterioration in the image quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A video encoding device for encoding a video signal, comprising:

a first encoding section for encoding a video signal to generate a first stream and extracting stream information including space- and time-related information of the video signal;

a stream buffer for storing video scenes of the first stream which correspond to a partial time of the video signal;

an encoding control section for detecting a change of information rate from the stream information and analyzing a code generation rate and motion information to generate encoding control information within a time during which the first stream can be stored in said stream buffer without exceeding a size thereof; and a second encoding section for encoding the first stream read from said stream buffer, in accordance with the encoding control information, to generate a second stream.

2. The video encoding device according to claim 1, wherein said stream buffer stores a plurality of video scenes corresponding to a time necessary for detecting at least the information rate change.

3. The video encoding device according to claim 1, wherein said stream buffer stores a plurality of video scenes corresponding to a time necessary for detecting a scene change as the information rate change.

4. The video encoding device according to claim 1, wherein said encoding control section compares a value of the stream information in one scene with those of the stream information of preceding and succeeding pictures in the same scene, and if the former differs from the latter, determines based on the values of the stream information of the preceding and succeeding pictures whether or not erroneous detection has occurred.

5. A video encoding method for encoding a video signal, comprising the steps of:

encoding a video signal to generate a first stream and extracting stream information including space- and time-related information of the video signal;

storing, in a stream buffer, video scenes of the first stream which correspond to a partial time of the video signal;

detecting a change of information rate from the stream information and analyzing a code generation rate and motion information to generate encoding control information within a time during which the first stream can be stored in the stream buffer without exceeding a size thereof; and encoding the first stream read from the stream buffer, in accordance with the encoding control information, to generate a second stream.

6. The video encoding method according to claim 5, wherein the stream buffer stores a plurality of video scenes corresponding to a time necessary for detecting at least the information rate change.

7. The video encoding method according to claim 5, wherein a value of the stream information in one scene is compared with those of the stream information of preceding and succeeding pictures in the same scene, and if the former differs from the latter, the method is determined based on the values of the stream information of the preceding and succeeding pictures whether or not erroneous detection has occurred.

* * * * *